United States Patent [19]

Asagiri et al.

[11] Patent Number: 4,850,610
[45] Date of Patent: Jul. 25, 1989

[54] AUTOMATIC SEATBELT APPARATUS

[75] Inventors: Katsuki Asagiri; Yuji Nishimura; Takashi Kawaharazaki; Noritada Yoshitsugu, all of Aichi, Japan

[73] Assignees: Kabushiki Kaisha Toka-Rika-Denki-Seisakusho; Toyota Jidosha Kabushiki Kaisha, both of Japan

[21] Appl. No.: 70,385

[22] Filed: Jul. 7, 1987

[30] Foreign Application Priority Data

Jul. 9, 1986 [JP] Japan .......................... 61-105378[U]

[51] Int. Cl.$^4$ ............................................. B60R 22/06
[52] U.S. Cl. ................................................... 280/804
[58] Field of Search ............... 280/801, 802, 804, 807, 280/808, 804

[56] References Cited

U.S. PATENT DOCUMENTS 4,496,170  1/1985  Sasaki et al. .................. 280/801
4,573,709  3/1986  Kawai et al. ................... 280/801
4,671,537  6/1987  Yoshitsugu ..................... 280/804
4,711,468 12/1987  Yoshitsugu ..................... 280/804

Primary Examiner—Richard A. Bertsch
Attorney, Agent, or Firm—Sixbey, Friedman, Leedom & Ferguson

[57] ABSTRACT

Disclosed is an automatic seatbelt apparatus which is capable of automatically applying, or canceling the application of, a webbing around an occupant of a vehicle, wherein a limit switch for detecting that a slider, which guides the webbing along a guide rail between a stopping position on the forward side and a stopping position on the rearward side of the vehicle, has arrived at the stopping position on the forward side of the vehicle is disposed in such a manner as not to hamper any further movement of the slider toward the front of the vehicle. Accordingly, the stopping position of the slider on the rearward side of the vehicle can be changed regardless of the stopping position at which the slider is located.

12 Claims, 5 Drawing Sheets

AUTOMATIC SEATBELT APPARATUS

BACKGROUND OF THE INVENTION

1. Field of the Invention:

The present invention relates to an automatic seatbelt apparatus which allows an occupant of a vehicle to have a webbing automatically applied to himself after being seated, and more particularly to an automatic seatbelt apparatus which allows the stopping position of a slider to be altered in accordance with the physical build of the occupant.

2. Description of the Prior Art:

Heretofore, a proposal has been made with respect to an automatic seatbelt apparatus which is capable of automatically applying, or canceling the application of, a webbing around an occupant of a vehicle (Japanese Utility Model Laid-Open No. 28552/1980).

The aforementioned automatic seatbelt apparatus is arranged such that one end of a webbing, the other end of which has been wound up by a takeup device installed in the central portion of a vehicle, is engaged in a slider which is capable of moving toward the front or rear of the vehicle by being guided by a guide rail disposed in the vicinity of the roof of the vehicle, thereby applying the webbing or canceling the application of the same by moving the slider.

More particularly, in a case where the slider has been moved to the end of the guide rail which is at the forward end of the vehicle, a space allowing the occupant to enter the vehicle is created between the intermediate portion of the webbing and a seat. When the occupant is seated on the seat, the slider moves to the vehicle rear end of the guide rail, thereby causing the webbing to be applied.

The stopping position of the slider which corresponds with this webbing-application state is detected by a limit switch so as to stop the slider. This limit switch is retained at a predetermined position (a position suited to an occupant of average build) on the guide rail, so that there are cases where such an automatic seatbelt apparatus fails to assume an optimum webbing-applied state when an occupant with a different type of build enters the vehicle.

To overcome this problem, there is an automatic seatbelt apparatus which is arranged such that the retaining position of the limit switch is made changeable.

Thus, if the position of the limit switch is adjusted in advance to suit the body of the individual occupant, an optimum webbing-applied state can be obtained.

However, in order to ensure that a load applied to the slider is transmitted positively to a vehicle body in a case where the vehicle is placed in a state of emergency, it is necessary to change the position of installation of a slider supporting member together with the position of the limit switch.

Since this supporting member is formed of a relatively heavy material with a relatively high rigidity, it is necessary to strengthen a moving mechanism for moving this supporting member, so that the structure disadvantageously becomes complicated, and the operating efficiency is poor.

In addition, with a structure in which the retaining position of the limit switch is made changeable, the change can be effected only when the slider is located at a stopping position either on the front side of the vehicle or on the rear side of the vehicle, and the change cannot be effected when the slider is in the other stopping position. Accordingly, since the change can be effected only before or after the occupant is seated on the seat, there has been a drawback in that this structure presents the problem of poor operating efficiency.

SUMMARY OF THE INVENTION

Accordingly, it is a primary object of the present invention to provide an automatic seatbelt apparatus which is light in weight and facilitates the adjustment of the slider-stopping position to change the webbing-applied position, and which is capable of posititively transmitting a load applied to the slider during a vehicular emergency and of effecting adjustment of the stopping position of the slider on the rear side of the vehicle.

To this end, according to the present invention, there is provided an automatic seatbelt apparatus which is capable of automatically applying, or canceling the application of, a webbing around an occupant of a vehicle, comprising: a guide rail disposed in the vicinity of the roof of a vehicle such as to extend in the longitudinal direction of the vehicle; a slider by which one end of the webbing is retained and which is capable of moving along the guide rail; a flexible elongated member for moving the slider along the guide rail between a first position on the forward side of the vehicle and a second position on the rearward side of the vehicle; an adjusting means which is capable of adjusting the second position; a driving means for driving the flexible elongated member; a flexible guide member disposed between the driving means and the guide rail and adapted to accommodate a part of the elongated member; and a first detection means disposed in such a manner as not to hamper the movement of the slider in the forward direction of the vehicle and adapted to detect the arrival of the slider at the first position.

Hence, since the occupant is able to adjust the slider-retaining position, he is able to obtain an optimum webbing-applied state.

In addition, even if the vehicle has fallen into a state of emergency, such as an overturn, it is possible to positively transmit the load applied to the slider to the vehicle body via the receiving member.

Furthermore, since the first detection means does not prevent the slider from moving toward the front side of the vehicle, it is possible to adjust the stopping position of the slider on the rear side of the vehicle regardless of the stopping position in which the slider is located.

BRIEF DESCRIPTION OF THE DRAWINGS

The above and other objects, features and advantages of the present invention will become more apparent from the following description of the prefered embodiments thereof, taken in conjunction with the accompanying drawings, in which like reference numerals denote like elements, and in which.

DESCRIPTION OF THE PREFERRED EMBODIMENT

Figure 1:
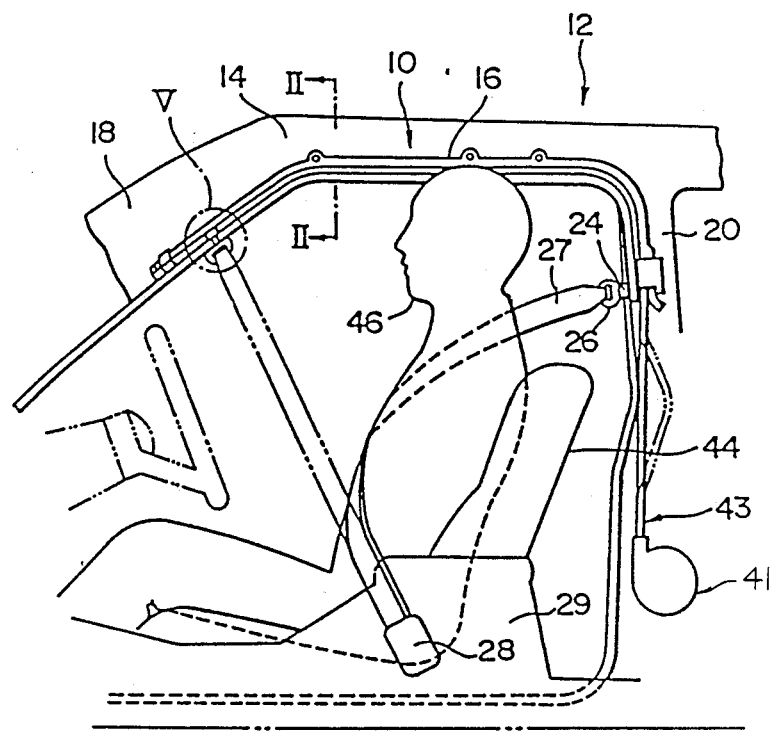
FIG. 1 is a front elevational view of an automatic seatbelt apparatus, as viewed from the side of a vehicle, according to the present invention.

Referring first to FIG. 1, there is shown an automatic seatbelt apparatus 10 embodying the present invention.

A guide rail 16 is installed on the roof side rail (not shown) of a roof side 14 of a vehicle 12.

The tip portion of this guide rail 16 extends along the front pillar 18 of the vehicle 12, while the rear end portion thereof is bent substantially orthogonally along a center pillar 20.

Figure 2:
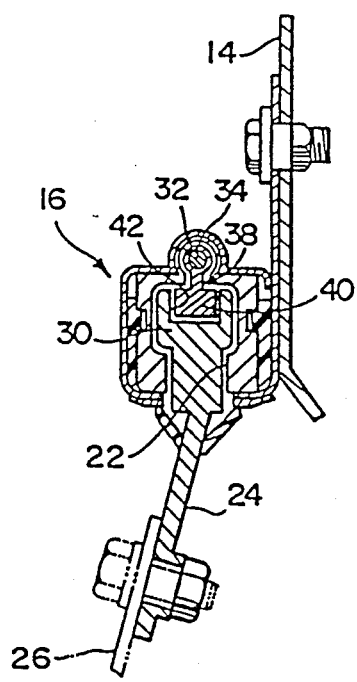
FIG. 2 is a cross-secitonal view taken along the line II—II of FIG. 1.

As shown in FIG. 2, a recess 22 is provided on that surface of the guide rail 16 which faces downwardly of the vehicle. A slider 24 is inserted into this recess 22, and one end of a webbing 27 (see FIG. 1) is retained thereby via a coupling member 26.

The other end portion of the webbing 27 is, after being taken up, accommodated in a takeup device 28 disposed in the central portion of the vehicle, as shown in FIG. 1. This takeup device 28 is secured inside a center console 29 to the chassis.

An inertia lock mechanism, which, at the time of vehiclular emergency, is capable of detecting the same by means of an acceleration sensor and instantly prevents the withdrawal of the webbing 27, is incorporated in the takeup device 28.

Figure 3:
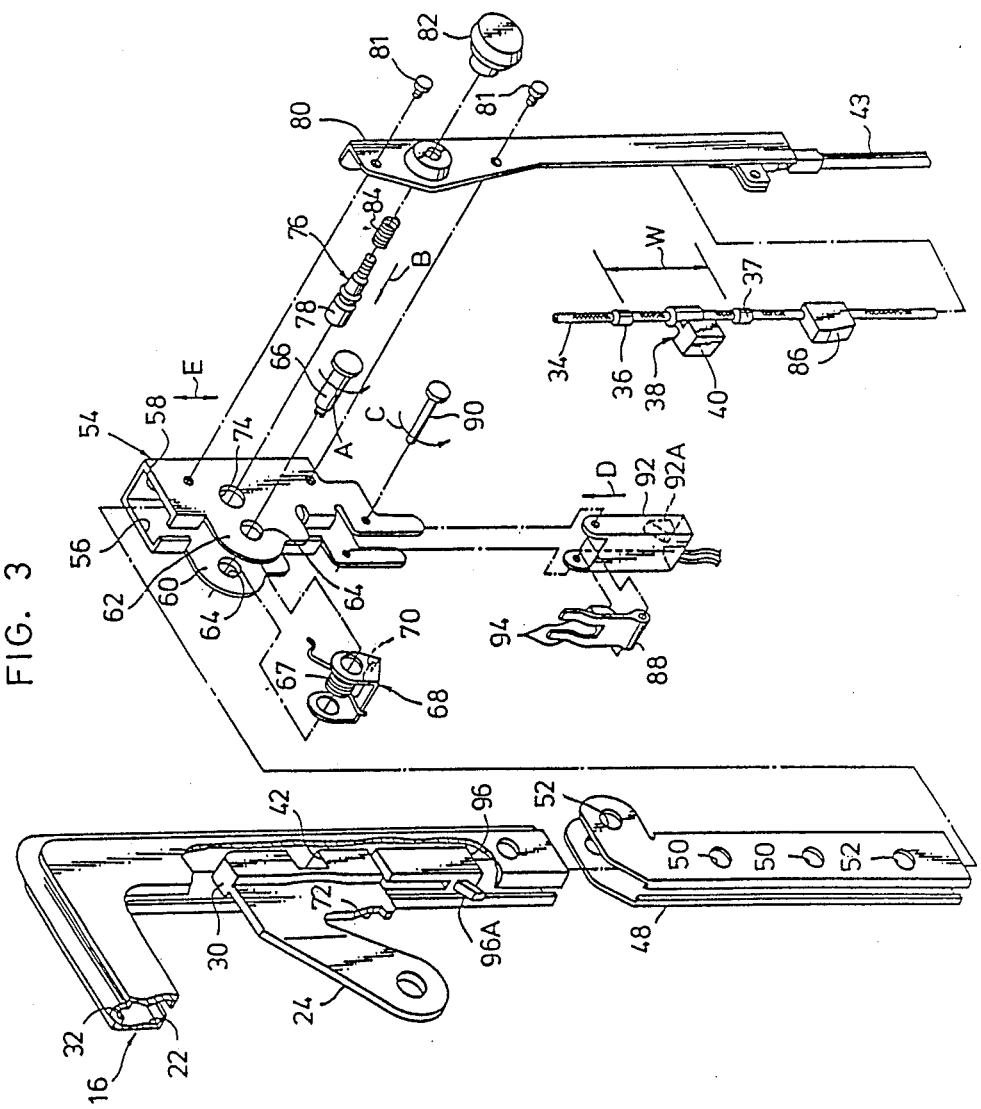
FIG. 3 is an exploded perspective view of a guide rail and members disposed in the vicinity thereof.

As also shown in FIG. 3, the width of the inside of the recess 22 of the guide rail 16 is expanded so as to accommodate a head portion 30 formed at the end portion of the slider 24. Furthermore, a wire accommodating groove 32 is formed on the bottom of the recess 22, and an elongated wire rope 34 is disposed therein.

As shown in FIG. 3, two rings 36, 37 are fitted with and retained at the tip portion of this wire rope 34 which constitutes a flexible elongated member, at a predetermined interval (the dimension W in FIG. 3), and a lost motion connector 38 is slidably fitted with the wire rope 34 therebetween.

A projection 40 extending toward the slider 24 is formed on the lost motion connector 38, and is accommodated in a recess 42 formed in the head portion 30 of the slider 24.

The rear end portion of the wire rope 34 extends along the wire accommodating groove 32 of the guide rail 16, passes through a wire guide tube 43 (see FIG. 1) installed at the rear end portion of the guide rail 16, and is taken up by the takeup reel of a driving means 41 constituted by a motor.

When the driving means 41 rotates forwardly, a compressive force is generated in the wire guide tube 43 which is flexible and constitutes a guide member, and the wire rope 34 is thereby adapted to move toward the front side of the vehicle along the wire accommodating groove 32.

In addition, when the driving means 41 is rotated in reverse, a tensile force is generated in the wire guide tube 43, which causes the wire rope 34 to move toward the rear side of the vehicle.

The lost motion connector 38 fixed to the wire rope 34 is adapted to move as it is pressed by the ring 36 or 37. In other words, the arrangement is such that when the wire rope 34 is moved toward the front of the vehicle, the slider 24 is pressed by the ring 37 located on the rear side of the vehicle. Meanwhile, when the wire rope 34 is moved toward the rear side of the vehicle, the slider 24 is pressed by the ring 36 located on the front side of the vehicle. As for the starting of movement of the slider 24, a slight time lag is created in relation to the time of starting of movement of the wire rope 34 by the margin of the interval between the rings 36, 37.

With this structure, when the slider 24 has been moved to the vehicle forward end portion of the guide rail 16, a space is created between the webbing 27 and a seat 44 (refer to the broken lines in FIG. 1), so that an occupant 46 can easily seat himself on the seat 44.

In addition, if, in this state, the slider 24 is moved to the vehicle rear end portion of the guide rail 16, the occupant 46 is able to apply the webbing.

Figure 4:
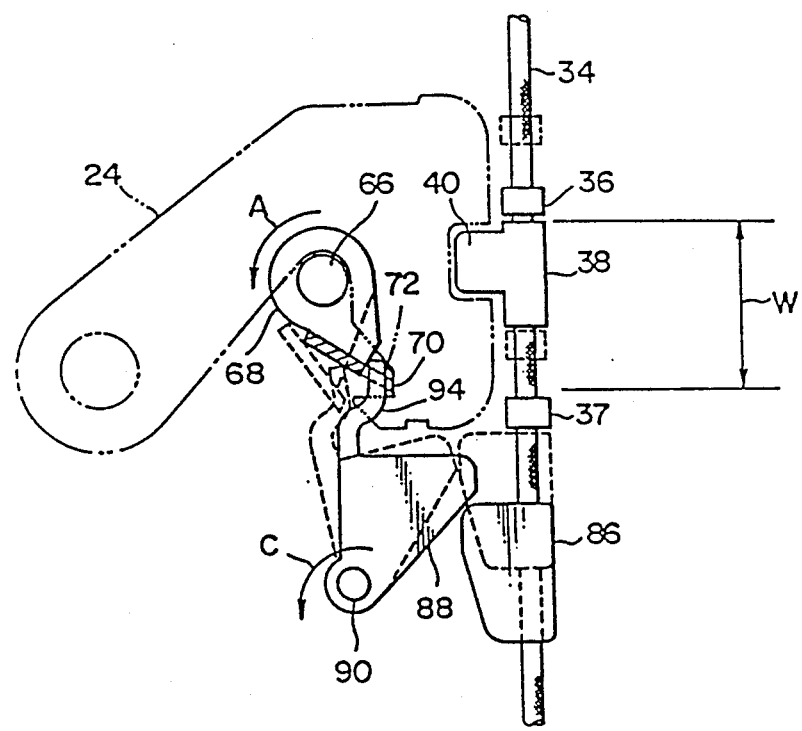
FIG. 4 is an enlarged perspective view of the vehicle rear end portion of the guide rail.

FIGS. 3 and 4 show a state in which the slider 24 has been moved to the rear end portion of the guide rail 16.

A reinforcement 48, which is a receiving member, is fitted around the outer periphery of the rear end portion of the guide rail 16. The reinforcement 48 is secured to the vehicle body via a bolt which is inserted into a circular hole 52. The arrangement is such that, when a state of emergency has occurred to the vehicle with the slider 24 in a webbing-installing position, the load applied to the slider 24 can be positively transmitted to the vehicle body via this reinforcement 48.

This reinforcement 48 is provided with a plurality of circular holes 50 along the longitudinal direction of the guide rail 16.

In addition, a holder 54 which constitutes a part of an adjustment means (moving means) is fitted around the outer periphery of the reinforcement 48. This holder 54 is provided with leg plates 56, 58 made of a plastic and formed parallel to each other, and is thereby formed substantially into a U-shape. The holder 54 is adapted to be capable of sliding in the direction of the arrow E in FIG. 3 in contact with the outer periphery of the reinforcement 48.

Projections 60, 62 are respectively formed at the tip portions of the leg plates 56, 58, and are provided with concentric circular holes 64, respectively.

A pin 66 is trained between the circular holes 64, and a pawl 68 is pivotally supported by this pin 66. The pawl 68 is formed substantially into a U-shape, and a pawl portion 70 is formed in one portion thereof so as to correspond with a recess 72 formed in the slider 24.

In addition, a torsion coil spring 67 is provided around the pin 66 which pivotally supports the pawl 68 and urges the pawl 68 in such a manner that the pawl portion 70 rotates in the direction of engagement with the recess 72 (in the direction of the arrow A in FIG. 3) with the pin 66 as a center. While this pawl portion 70 is engaged with the recess 72, the slider 24 is adapted to be prevented from moving in the forward direction of the vehicle along the guide rail 16.

A circular hole 74 is provided in the leg plate 58 of the holder 54 and is adapted to correspond with the circular hole 50 of the reinforcement 48 when the holder 54 is slided.

A large-diameter portion 78, which is formed in one end portion of a lock pin 76, i.e., an adjustment means, penetrates into the circular hole 74. After its intermediate portion penetrates a tension holder 80, the other end portion of this lock pin 76 is screwed into a knob 82. Incidentally, a compression coil spring 84 is interposed between the tension holder 80 and the large-diameter portion 78 so as to urge the lock pin 76 in the direction of the arrow B in FIG. 3.

Accordingly, when the holder 54 is selectively disposed at a position in which the circular hole 74 is concentric with the circular hole 50, the lock pin 76 also penetrates into the circular hole 50 so as to prevent the holder 54 from moving any further. In addition, when the knob 82 is pulled in the direction opposite to that of the arrow B in FIG. 3 in opposition to the urging force of the compression coil spring 84, the lock pin 76 comes out of the circular hole 50, with the result that the holder 54 becomes slidable.

The tension holder 80 is installed on the holder 54 by means of a screw 81 and extends downward with respect to the vehicle, a tip thereof being secured to the upper end portion of the wire guide tube 43. Accordingly, when the tension holder 80 moves in conjunction with the movement of the holder 54, the wire guide tube 43 is also adapted to move.

The wire guide tube 43 is linear (see FIG. 1) with the lock pin 76 disposed in the circular hole 50 in the upper portion of the reinforcement 48. Accordingly, when the tension holder 80 moves downward with respect to the vehicle, the wire guide tube 43 is bent in an arcuate shape (see the alternate long and two short dashes lines in FIG. 1) since it is flexible.

In other words, it is possible to move the lost motion connector 38 without changing the amount of paying out of the wire rope 34 from the takeup reel of the driving means 41, and the slider 24 also moves in conjunction with the same.

A lost motion piece 86 is fitted with and retained at this wire rope 34 even more rearward in the the vehicle as viewed from the ring 37, and corresponds with a lost motion lever 88. The lost motion lever 88 is pivotally supported by the holder 54 together with a first limit switch 92 via the pin 90.

Bifurcating extended portions 94 of a narrow width extending toward the pawl 68 are formed integrally with the lost motion lever 88. Each of the tip portions of these extended portions 94 abuts against the pawl 68 in such a manner as to clamp the pawl portion 70 of the pawl 68 thereby. When the lost motion lever 88 rotates in the direction of the arrow C in FIG. 3 with the pin 90 as a center, the extended portions 94 are adapted to press the pawl portion 70 of the pawl 68 in the direction of separating the pawl portion 70 of the pawl 68 from the recess 72 against the urging force of the torsion coil spring 67.

The lost motion lever 88 is adapted to rotate as the wire rope 34 interferes with the lost motion piece 86 at the time when the wire rope 34 moves toward the forward direction of the vehicle.

The first limit switch 92 is arranged such that its contact 92A corresponds with the projection 96A of a push dog 96 which is fitted slidably in the groove 22 of the guide rail 16. The contact 92A is adapted to move upward with respect to the vehicle (in the direction of the arrow D in FIG. 3) by means of the urging force of an urging means (not shown).

Incidentally, the push dog 96 presses the contact 92A by its own weight, but does not have enough weight to push down the contact 92A. In addition, this push dog 96 may be omitted if the slider 24 can be provided with a portion which is equivalent to the projection 96A.

Here, the arrangement is such that, when the slider 24 moves in the rearward direction of the vehicle, the head portion 30 thereof pushes down the push dog 96, which, in turn, causes the projection 96A to depress the contact 92A, thereby stopping the driving force of the driving means 41.

As shown in FIG. 4, the interference of the lost motion piece 86 with the lost motion lever 88 is synchronized with the movement of the slider 24 is effected when pressed by the lost motion connector 38.

In other words, when the wire rope 34 starts to move in the forward direction of the vehicle, the ring 36 and the lost motion connector 38 are in contact with each other (see solid lines in FIG. 4), and the lost motion piece 86 is adapted to rotate the lost motion lever 88 until the lost motion connector 38 is pressed by the ring 37 (see broken lines in FIG. 4).

Accordingly, at the time when the slider 24 is started to move by the lost motion connector 38, the pawl portion 70 is separated from the recess 72, and does not affect the movement of the slider 24.

Figure 5:
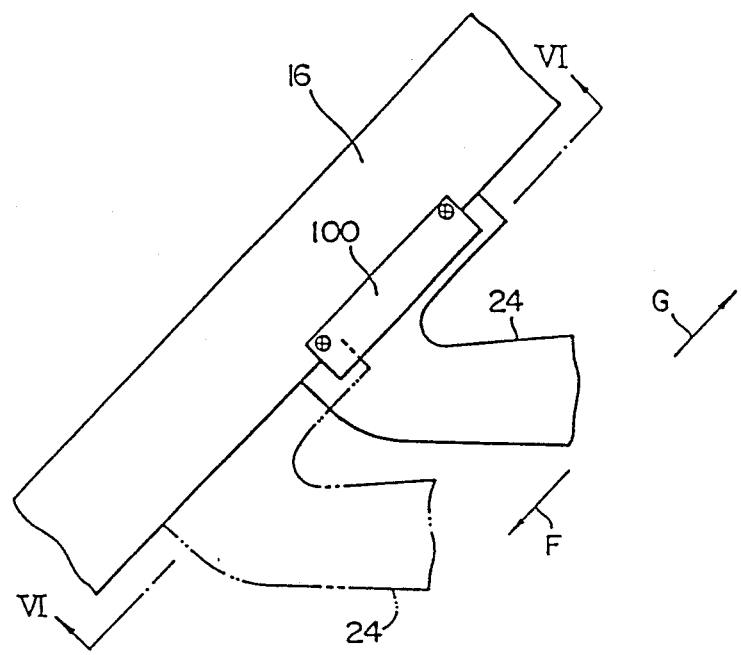
FIG. 5 is a detailed diagram of a portion V shown in FIG. 1.
Figure 6:
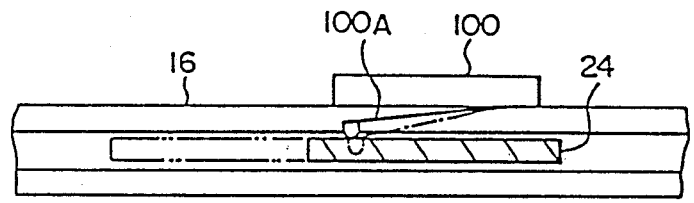
FIG. 6 is a cross-sectional view taken along the line VI—VI of FIG. 5.

As shown in FIG. 5, a second limit switch 100, which is a detection means, is disposed at a side end portion of the guide rail 16 in the forward direction of the vehicle. The second limit switch 100 is provided with a contact 100A, as shown in FIG. 6. The contact 100A is urged counterclockwise as viewed in FIG. 6, and projects into the traveling path of the slider 24, as shown by an alternate long and short dash line in the drawing, before the slider 24 is moved. The contact 100A is pressed by the slider 24 which has been moved in the forward direction of the vehicle, and swings clockwise up to the position shown by the solid line in FIG. 6, against the urging force. As a result, the second limit switch 100 is adapted to be able to detect the arrival of the slider 24.

The position shown by the solid lines in FIGS. 5 and 6 is is a normal stopping position at a forward limit of the slider 24. However, there are cases where, in conjunction with the operation of moving the holder 54, the slider 24 is advanced further from the position shown by the solid lines to the position shown by the alternate long and two short dashes lines in the drawings. In this case as well, the contact 100A still remains in contact with the slider 24 and is held moved to the position shown by the alternate long and two short dashes lines in the drawings. Incidentally, the counterclockwise urging force, as viewed in FIG. 6, may be obtained for the contact 100A by forming the same with a spring material. Alternatively, a separate urging means such as a spring may be provided to cause the contact 100A to be urged thereby.

Description will be made hereinafter of the operation of the present embodiment.

When the occupant 46 is about to enter a vehicle, the slider 24 has been moved to the vehicle forward end portion of the guide rail 16, and a space is created between the webbing 27 and the seat 44, so that the occupant is readily able to seat himself on the seat 44.

When the occupant 46 is seated on the seat 44, the driving means 41 is rotated in reverse, causes tension to be generated in the wire rope 34, and moves the slider 24 along the guide rail 16 toward the rear of the vehicle by means of the pressing force of the lost motion connector 38 by virtue of the ring 36.

When the wire rope 34 is moved, the lost motion piece 86 is first brought into contact with the lost motion lever 88, thereby rotating the lost motion lever 88 counterclockwise as viewed in FIG. 3 (in the direction of the arrow C in FIG. 3).

As this lost motion lever 88 rotates, the extended portions 94 rotate the pawl 68 in the opposite direction to that of the arrow A in FIG. 3 with the pin 66 as a center against the urging force of the torsion coil spring 67.

While this state is being maintained, the tip of the head portion 30 of the slider 24 passes without interfering the pawl 68.

The holder 54 is disposed at the vehicle rearward-side end portion of the guide rail and is secured as the lock pin 76 is fitted into a specified circular hole 50 of the lock pin 76.

This holder 54 is provided with the first limit switch 92, and when the slider 24 approaches the same, the end portion of the head portion 30 of the slider 24 is brought into contact with the push dog 96. The projection 96A of the push dog 96 then pushes up the contact 92A of the first limit switch 92, thereby stopping the drive of the driving means 41. Thus the occupant 46 assumes the webbing-applied state.

At this juncture, the lost motion piece 86 is separated from the lost motion lever 88, and the pressing of the pawl 68 by the lost motion lever 88 is canceled.

As a result, the pawl 68 rotates in the direction of the arrow A in FIG. 3 with the pin 66 as a center by means of the urging force of the torsion coil spring 67, and the pawl portion 70 is engaged into the recess 72 of the slider 24.

If the vehicle falls into a state of emergency at that time, this state is detected by the acceleration sensor, and the inertia lock mechanism is actuated, with the result that the pulling out of the webbing 27 from the takeup device 28 is prevented instantaneously.

Thus it is possible to maintain the state of restraint imposed on the occupant 46. In this case, although the load is applied to the slider 24 via the webbing 27 owing to the inertia of the occupant 46, this load can be positively transmitted from the head portion 30 of the slider 24 to the vehicle body via the reinforcement 48.

Incidentally, even if the vehicle is overturned and load is applied such as to move the slider 24 in the forward direction of the vehicle along the guide rail 16, since the pawl portion 70 of the pawl 68 is engaged in the recess 72 of the slider 24, the slider 24 will not move, and this load can be positively transmitted to the vehicle body.

In addition, when an occupant having a different built enters this vehicle, it is possible to change the stopping position of the slider 24 by inserting the lock pin 76 into another circular hole 50 by taking account of the body size of the new occupant.

To explain this operation more specifically, the knob 82 is first pulled upward (in the opposite direction to that the arrow B in FIG. 3) against the urging force of the compression coil spring 84.

By this operation, the lock pin 76 is disengaged from the circular hole 50. As a result, the holder 54 becomes slidable, and the lock pin 76 can be readily made to correspond with another circular hole 50.

If the lifting of the knob 82 is canceled with the lock pin 76 and the circular hole 50 made to correspond to each other, the lock piin 76 is inserted into the circular hole 50, thereby securing the holder 54.

In addition, since the wire guide tube 43, together with the tension holder 80, is also bent from the linear state into an arcuate shape, the slider can be moved without changing the virtual length of the wire rope 34 between the takeup reel of the driving means 41 and the lost motion connector 38.

The operation of changing the stopping position of the slider 24 can be effected when the slider 24 is in the stopping position either at a forward limit or at a backward limit.

In other words, when the slider 24 is at the backward limit, the apparatus operates as follows: If the holder 54 is moved, the tension holder 80 also moves together with the holder 54, and the configuration of the wire tube 43 undergoes a change, as described above. Accordingly, the wire rope 34 in the wire accommodating groove 32 in the guide rail 16 also moves in conjunction with the movement of the holder 54, so that the positional relationship between the wire rope 34 and the lost motion connector 38 does not change.

In addition, when the slider 24 is at the forward limit, the apparatus operates as follows: If the holder 54 is moved from the lower position to the upper position, the wire rope 34 moves toward the front of the vehicle, and the slider 24 similarly moves by the compressive force of the wire rope 34. At that time, the second limit switch 100 does not prevent the movement of the slider 24. According to the conventional arrangement of the limit switch, since the limit switch prevents the movement of the slider 24, no room is provided to allow the wire rope 34 to escape, so that, when the slider 24 is at the stopping position at the forward limit, it has been impossible to move the holder upwardly from below.

Detailed description will now be made of the operation for changing the stopping position at the backward limit of the slider 24 when the slider 24 is at the stopping position at the forward limit thereof.

First, description will made of cases where the stopping position of the slider 24 at its backward limit is raised by moving the holder 54 upward from its lower position. In this case, before the operation of moving the holder 54 is started, the slider 24 is stopped at the position shown by the solid lines in FIGS. 5 and 6. When the movement of the holder 54 is started, the slider 24 starts to move in the direction of the arrow F (i.e., in the forward direction of the vehicle). When the movement of the holder 54 is completed, the slider 24 has been moved to the position shown by the alternate long and two short dashes line. Since the contact 100A of the limit switch 100 is held in pressure contact with the slider 24 while maintaining the same posture, the driving means 41 continues to maintain its non-driving state.

Incidentally, with respect to the slider 24 located at the position shown by the alternate long and two short dashes line, when the slider is moved again toward the front of the vehicle after having moved to the stopping position at the backward limit, the slider 24 is stopped at the position shown by the solid lines. Accoridngly, even if the stopping position of the slider 24 at the backward limit is changed, the stopping position at the forward limit is not changed.

Next, description will be made of cases where the holder 54 is moved downwardly from its upper position to lower the stopping postion of the slider 24 at the backward limit. In this case as well, before the operation of moving the holder 54 is started, the slider 24 is stopped at the position shown by the solid lines in FIGS. 5 and 6. When the movement of the holder 54 is started, the slider 24 starts to move in the direction of the arrow G (i.e., toward the rear of the vehicle). When the slider 24 is moved, the contact 100A of the limit switch 100 is separated from the slider 24 and is swung counterclockwise by means of the urging force. As a result, the driving means 41 is driven, and the slider is returned to the positions shown by the solid lines. Hence, when the movement of the holder 54 is completed, the slider 24 is at the position shown by the solid lines.

It should be noted that, even if the driving means 41 is driven during an operation of moving the holder 54, as described above, no adverse effect results.

As described above, since the retaining position of the slider 24 on the rear side of the vehicle can be changed in accordance with the build of an occupant regardless of the stopping position at which the slider 24 is located, it is possible to conveniently obtain an optimum webbing-applied state for an occupant of a wide-ranging type of physical build.

In this case, the load is not applied directly to the holder 54 during a vehicular emergency, which makes it possible to fabricate the holder 54 with a relatively lightweight plastic, so that the operation of the holder 54 can be facilited. This operational ease is also largely attributable to the that only a light force is required in adjustment since the holder 54 can be moved without applying load to the wire rope 34.

Next, when the occupant 46 leaves the vehicle after it stops, the slider 24 is moved to the vehicle forward-side end portion of the guide rail 16.

To explain this operation, the driving means 41 first starts rotating, and a compressive force is applied to the wire rope 34 inside the wire guide tube 43.

As a result, the wire rope 34 starts moving toward the front of the vehicle along the guide rial 16.

At this juncture, the lost motion piece 86 moving together with the wire rope 34 abuts against the lost motion lever 88, which causes the pawl portion 70 of the pawl 68 to be disengaged from the recess 72.

This operation is carried out while the ring 37 is being brought into contact with the lost motion connector 38, and there is a slight time lag before the movement of the slider 24 starts to move, the marging being the dimension W (see FIG. 3). Thus, since the engagement between the pawl portion 70 and the recess 72 can be automatically canceled, the complication in operation can be reduced.

Incidentally, although the wire rope 34 is used as the elongated member, it is also possible to use a thin flexible tape.

What is claimed is:

1. An automatic seatbelt apparatus which is capable of automatically applying, or canceling the application of, a webbing around an occupant of a vehicle, comprising:

a guide rail disposed in the vicinity of the roof of a vehicle such as to extend in the longitudinal direction of the vehicle;

a slider by which one end of said webbing is retained and which is supported by said guide rail and is capable of moving therealong;

a flexible elongated member connected to said slider and adapted to move said slider along said guide rail between a webbing-application position on the rearward side of the vehicle and a webbing application-canceling position on the forward side of the vehicle;

a moving means capable of moving said webbing-application position along the longitudinal direction of said guide rail;

a driving means for driving said slider toward said webbing-application position or said webbing application-canceling position by imparting a driving force to said flexible elongated member;

a flexible guide member disposed between said driving means and said guide rail and adapted to accommodate a part of said elongated member; and a receiving member for transmitting the load applied to said slider to the vehicle body when said slider is in said webbing-application position; and a first detection means disposed in such a manner as not to hamper the movement of said slider in the forward direction of the vehicle and adapted to detect the arrival of said slider at said webbing application-canceling position.

2. An automatic seatbelt apparatus according to claim 1, wherein said first detection means includes a switch which has a contact located on a traveling path of said slider by means of an urging force and which is adapted to detect the arrival of said slider at said webbing application-canceling position when said contact is moved out of said traveling path by said slider against said urging force.

3. An automatic seatbelt apparatus according to claim 2, wherein said receiving member is installed around the outer periphery of a vehicle rearward-side end portion of said guide rail, and is constituted by a reinforcement member secured to the vehicle.

4. An automatic seatbelt apparatus according to claim 3, further comprising a second detecting means for detecting the arrival of said slider at said webbing-application position.

5. An automatic seatbelt apparatus according to claim 4, wherein said moving means is adapted to move in correspondence with the bending of said guide member.

6. An automatic seatbelt apparatus according to claim 5, wherein said moving means has a locking means for selectively locking said moving means at a plurality of positions.

7. An automatic seatbelt apparatus according to claim 6, wherein said second detection means is supported by said moving means, and is moved together with said moving means.

8. An automatic seatbelt apparatus which is capable of automatically applying, or canceling the application of, a webbing around an occupant of a vehicle, comprising:

a guide rail disposed in the vicinity of the roof of a vehicle such as to extend in the longitudinal direction of the vehicle;

a slider by which one end of said webbing is retained and which is supported by said guide rail and is capable of moving along the longitudinal direction of said guide rail;

a flexible elongated member for moving said slider along said guide rail between a vehicle forward-side stopping position and a vehicle rearward-side stopping position;

a stopping position changing means capable of changing said vehicle rearward-side stopping position of said slider;

a receiving means for transmitting the load applied to said slider when said slider is in said vehicle rearward-side stopping position;

a flexible guide member disposed between said driving means and said guide rail and adapted to accommodate a part of said elongated member; and a first detection means for detecting the arrival of said slider at said vehicle forward-side stopping position; and a second detection means for detecting the arrival of said slider at said vehicle rearward-side stopping position.

9. An automatic seatbelt apparatus according to claim 8, wherein said first detection means includes a limit switch which has a contact located on a traveling path of said slider by means of an urging force and which is adapted to detect the arrival of said slider at said vehicle forward-side stopping position when said contact is moved out of said traveling path by said slider against said urging force.

10. An automatic seatbelt apparatus according to claim 9, wherein said stopping position changing mens is adapted to change said vehicle rearward-side stopping position in correspondence with the bending of said guide tube.

11. An automatic seatbelt apparatus according to claim 10, wherein said stopping position changing means has a locking means for selectively locking said stopping position changing means at one of a plurality of predetermined positions.

12. An automatic seatbelt apparatus according to claim 11, wherein said second detection means is supported by said stopping position changing means and is moved together with said stopping position changing means.

* * * * *